United States Patent
AlZahrani et al.

(10) Patent No.: US 11,416,586 B2
(45) Date of Patent: Aug. 16, 2022

(54) SECURE COMMUNICATION APPLICATION REGISTRATION PROCESS

(71) Applicant: Saudi Arabian Oil Company, Dhahran (SA)

(72) Inventors: Abdullah A. AlZahrani, Dhahran (SA); Ibrahim S. Alomari, Dhahran (SA); Khalid M. Moashee, Dhahran (SA); Hassan A. Ayoub, Dhahran (SA); Meshal I. Alhazmi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 231 days.

(21) Appl. No.: 16/588,791

(22) Filed: Sep. 30, 2019

(65) Prior Publication Data

US 2021/0097153 A1 Apr. 1, 2021

(51) Int. Cl.
*G06F 21/12* (2013.01)
*G06F 21/31* (2013.01)

(52) U.S. Cl.
CPC .......... *G06F 21/128* (2013.01); *G06F 21/31* (2013.01); *G06F 2221/0713* (2013.01)

(58) Field of Classification Search
CPC ...... G06F 21/31; G06F 21/128; G06F 21/125; G06F 21/105; G06F 2221/0713
See application file for complete search history.

(56) References Cited

U.S. PATENT DOCUMENTS

| 5,963,914 A * | 10/1999 | Skinner | G06F 11/34 |
| | | | 705/7.15 |
| 7,703,142 B1 * | 4/2010 | Wilson | H04W 12/084 |
| | | | 726/26 |
| 8,819,432 B2 | 8/2014 | Bergsten et al. | |

(Continued)

FOREIGN PATENT DOCUMENTS

WO 2013109992 A2 7/2013

OTHER PUBLICATIONS

International Search Report and Written Opinion in Corresponding PCT Application No. PCT/US2020/052497 dated Dec. 2, 2020. 11 pages.

*Primary Examiner* — Robert B Leung
(74) *Attorney, Agent, or Firm* — Leason Ellis LLP

(57) ABSTRACT

A method for registering and activating an application downloaded to a user device, the application being provided from an application server of an enterprise. The method comprises generating an activation code for activating downloaded applications which are pending activation, storing the generated activation code on the application server, the first server not being accessible to the user and only being accessible to a jump server, enabling an administrator to access the jump server using two-factor authentication, accessing the first sever via the jump server, responding to a command by the administrator, provided through a remote connection between the jump server and the application server, by electronically communicating to the administrator activation codes associated with applications pending acti- (Continued)

vation, and completing registration and activation of the application by providing a manually transferred code into the user device. The activation code is manually transferred from the administrator to the user.

12 Claims, 2 Drawing Sheets

(56) References Cited

U.S. PATENT DOCUMENTS

| | | | | |
|---|---|---|---|---|
| 9,847,994 | B1* | 12/2017 | Kelly | H04L 63/067 |
| 10,223,520 | B2 | 3/2019 | Oberheide et al. | |
| 2002/0164025 | A1* | 11/2002 | Raiz | G06F 21/10 |
| | | | | 380/231 |
| 2009/0119779 | A1* | 5/2009 | Dean | G06F 21/105 |
| | | | | 726/26 |
| 2013/0144755 | A1* | 6/2013 | Mowatt | G06Q 30/06 |
| | | | | 705/26.41 |
| 2014/0189808 | A1* | 7/2014 | Mahaffey | H04L 63/083 |
| | | | | 726/4 |
| 2015/0334105 | A1* | 11/2015 | Kessler | H04L 67/025 |
| | | | | 726/5 |
| 2016/0261411 | A1 | 9/2016 | Yau et al. | |
| 2019/0089705 | A1* | 3/2019 | Chud | G06F 21/30 |

\* cited by examiner

SECURE COMMUNICATION APPLICATION REGISTRATION PROCESS

FIELD OF THE DISCLOSURE

The present disclosure concerns information technology (IT) security and more particularly relates to a secure registration method for newly installed communication applications.

BACKGROUND OF THE DISCLOSURE

With the ever-increasing sophistication of cyber-attacks and interceptions, the need for security in applications used by the enterprise has become paramount. It is important for organizations to be able to ensure that such applications, including voice, video, instant messaging and other applications are secure against unauthorized tampering. One of the ways this is done involves an application registration process that serves to authenticate the user and the security of the application. While a number of registration techniques have been proposed, they do not necessarily provide a sufficiently high degree of security, particularly for communications applications that are frequently used and are prime targets for attacks and interception.

SUMMARY OF THE DISCLOSURE

This disclosure provides a method for securely registering and activating an application downloaded to a user device of a user, the application being provided from an application store maintained by an application server of an enterprise, wherein a number is associated with the user device. The method comprises generating an activation code suitable for activating downloaded applications which are pending activation, storing the generated activation code on the application server, the first server not being accessible to the user and only being accessible to a jump server, enabling an administrator to access the jump server using two-factor authentication, accessing the first sever via the jump server, responding to a command by the administrator, provided through a remote connection between the jump server and the application server, by electronically communicating to the administrator any activation codes associated with applications pending activation, and completing registration and activation of the application downloaded by the user by providing a manually transferred code into the user device. The activation code associated with the application downloaded by the user is manually transferred from the administrator to the user.

In certain embodiments, the application is downloaded to the user via a second server different from the first server.

In certain implementations, the two-factor authentication is based on at least two of i) a knowledge factor, ii) a possession and iii) a biometric factor. The knowledge factor can be one of a password and personal identification number (PIN). The possession factor can be an identifier of a device.

In certain embodiments, all of the activities of the administrator on or through the jump server are logged.

The present disclosure also provides A method of securely registering and activating an application at a user device in an organization having an administrator which comprises verifying an identity of the administrator using 2-factor authentication; and providing access to a secure server to the administrator upon acceptance of the 2-factor authentication; and enabling the administrator to obtain an activation code from the secure server for activating the application, wherein the administrator thereby has the activation code for communication to a user of the user device for activating the application.

The method can further comprise continually logging activity of the administrator. The two-factor authentication can be based on at least two of i) a knowledge factor, ii) a possession and iii) a biometric factor.

The present disclosure further provides a method of securely registering and activating an application at a user device in an organization having an administrator which comprises generating an activation code for activating the application on the user device; and responding to a command by the administrator, provided through a remote connection established from a jump server accessible to the administrator, by electronically communicating to the administrator the activation code associated with the application at the user device, wherein upon receiving the output activation code, the administrator communicates the activation code to the user device for registering and activating the application.

The activation code can be stored in association with an identifier of the user device having the application to be registered and activated. The identifier of the user device can a phone number or an IP address.

In certain implementations, the administrator communicates the activation code to the user device via link in a text message or an email.

These and other aspects, features, and advantages can be appreciated from the following description of certain embodiments of the invention and the accompanying drawing figures and claims.

DETAILED DESCRIPTION OF CERTAIN EMBODIMENTS OF THE DISCLOSURE

Disclosed herein is a secure registration method for newly installed applications used by an enterprise. Organizations are concerned that personnel can either download applications from untrusted sources or, alternatively, that trusted internal application servers can be compromised. In the disclosed method, an end user downloads, at a user device, an application from a secure source. The application cannot be activated, however, until a registration process is completed which ensures that the end user is approved to use the application. The application server generates an activation code that, when ultimately received by the user, can be used to activate the application. An IT administrator logs in to a jump server that has access to the application server via 2-factor authentication in order to obtain access to the generated activation code. Upon successful login, the administrator executes a command that causes the application server to release the activation code to the administrator. The administrator then sends the activation code to the user device. The user uses the activation code as a verification criterion to register the application. Following registration and verification, the application can be activated on the user device.

Figure 1:
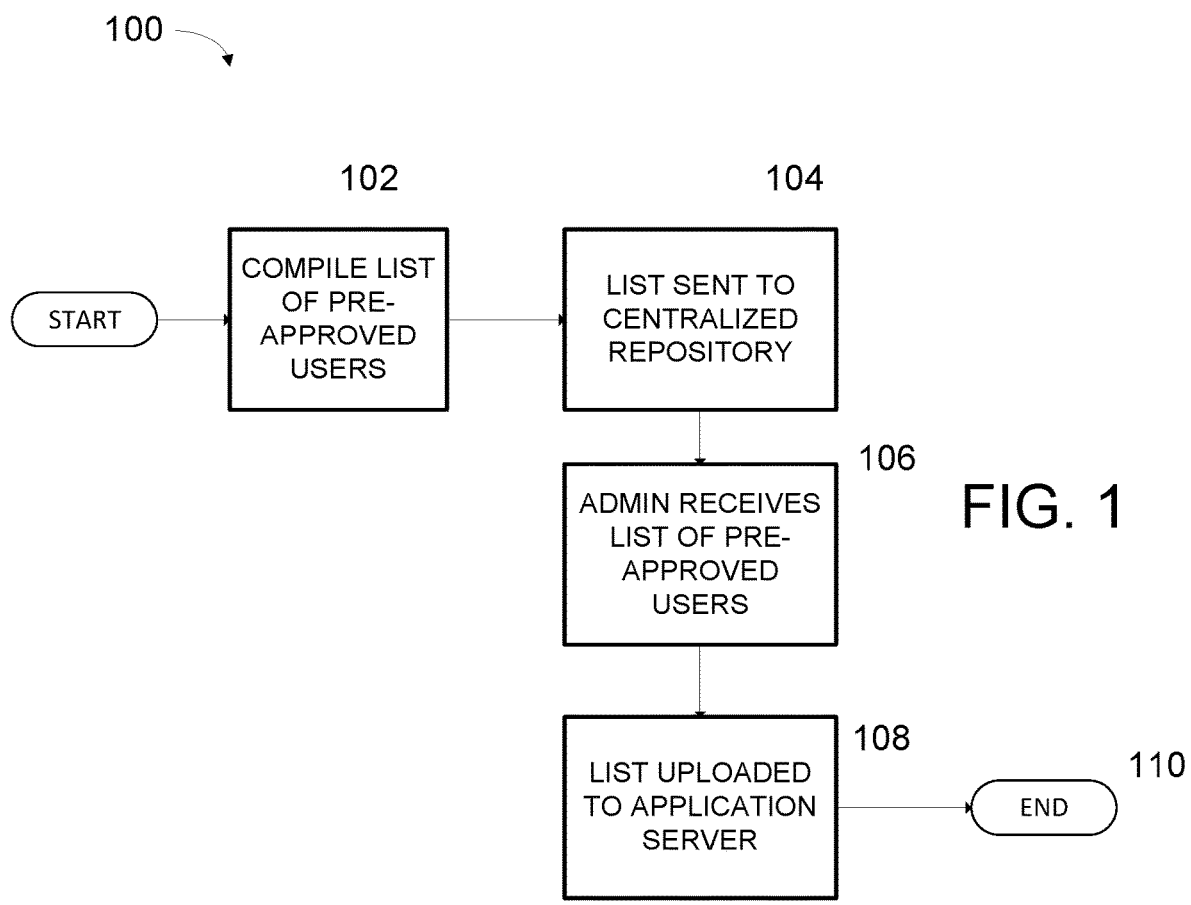
FIG. 1 is a schematic flow diagram of an access control procedure that is performed in some embodiments as an initial stage of the secure registration method of the present disclosure.

The secure registration method of the present invention relies in part on the IT administration of an organization having knowledge of the individuals authorized to access a secure communication application. Accordingly, in certain embodiments, an access control procedure is implemented as a preface to the secure registration method of the present disclosure. FIG. 1 is a schematic flow diagram of an embodiment of an access control method. The method begins in step 100. At a following step 102, an initial list of all pre-approved users is compiled by a responsible part of the organization such as IT executive support. At step 104, the initial list is sent for approval to a centralized entity such as an executive manager or committee. One or more persons can be added or removed to the initial list by the centralized entity. This measure ensures that only trusted individuals remain on the approved list. At step 106, the Admin device receives the approved list as a communication from the centralized entity such as via an approval email. The approved list is then uploaded to an application server at step 108. The method ends at step 110. An example of information in the approved list (showing two representative examples) is shown in Table I below. Each of the users is associated with a phone # or other device ID such as an IP address. The table also includes information regarding whether specific applications (in this example "application A") have been downloaded to the user device and, if so, whether the application has been activated.

TABLE I

| Name | Department | Phone #/ Device ID | Application A Status |
|---|---|---|---|
| Carlo Zabroni | Petrochemicals | 81248776 | Not Downloaded |
| Salman Al-Taie | Plant Infrastructure | 86923980 | Downloaded/ Not Activated |

An application server is configured to download application software to user devices. However, to provide an extra level of security, the application servers are not accessible directly from any user devices (in other words, there is a one-way communication). Rather, the application servers receive the input of approved user lists from a device of the administrator 220 (see FIG. 2). The list includes users who have requested an application to be downloaded. For example, in the example above, the application server can scan the table, determine that user Carlo Zabroni has requested application A, and that application A has not yet been downloaded to the user device with ID "81248776." Upon determining that Carlo Zabroni is an approved user who has requested and not yet received the application, the application server can then download the application to Carlo Zambroni's user device. The application server can be configured to monitor the approved user list periodically.

Figure 2:
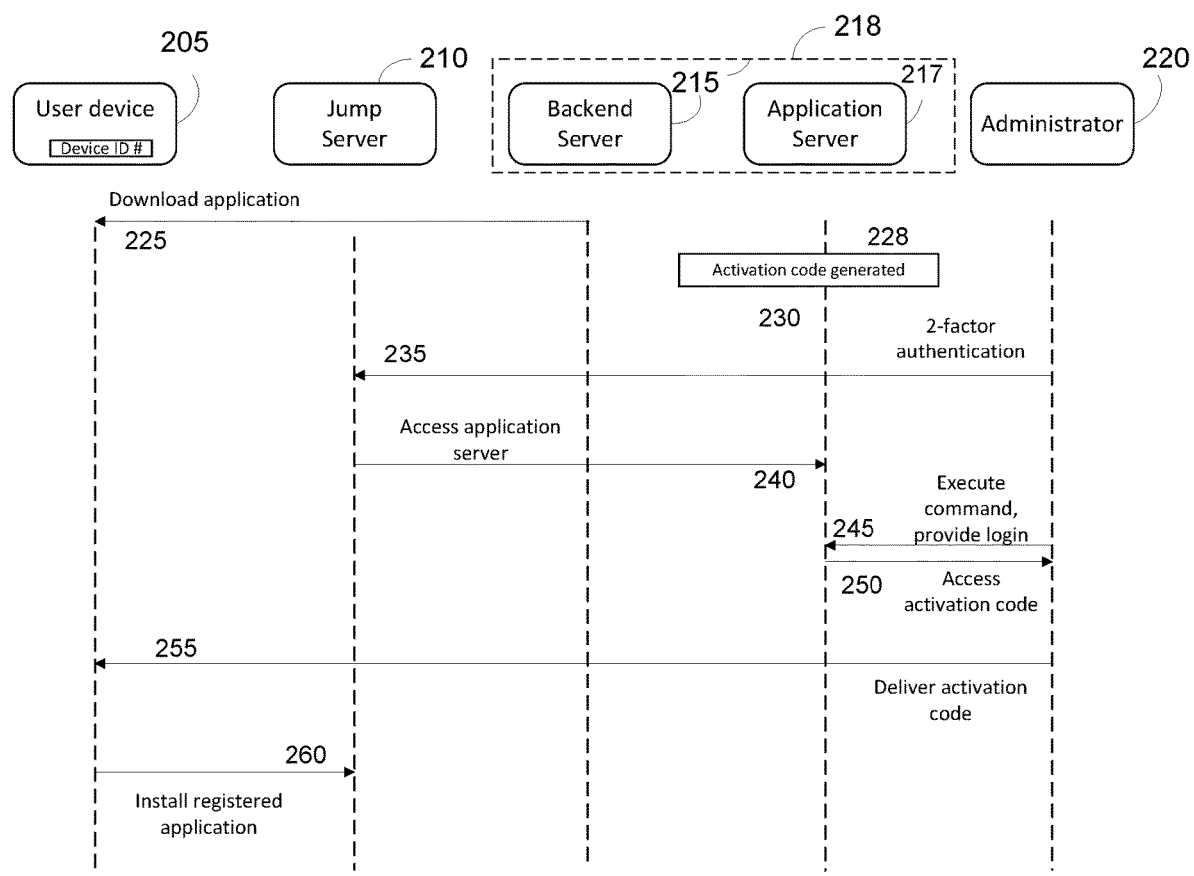
FIG. 2 is a sequence diagram of a secure communication method according to an embodiment of the present disclosure.

With continued reference to FIG. 2 a sequence diagram of a secure registration method is shown according to an embodiment of the present disclosure. There are several entities that play a role in the registration process. First among the entities is the individual person ("user") who wishes to install and activate a communication application. The user interacts with the other entities via electronic communications using a "user device" 205, which can be, without limitation, a mobile device, a tablet, laptop computer, desktop computer or any other computing device with sufficient processing power and communication capability. The user device 205 is associated with certain identification criteria ("device ID") including, but not limited to, a unique phone number or IP address. Other entities include an administrator at an administrator device 220, who is responsible for monitoring and maintaining IT security for the pertinent organization. In addition, the entities involved in the registration process include a jump server 210 and the application server 217, mentioned above. The application server 217 can comprise different services provided by the same physical or virtual server 218. In other embodiments, application server 217 can be implemented on distinct devices or platforms.

The jump server 210 and application server 217 are secure servers. In some implementations, all of the servers 210, 217 are internal to the relevant organization. The servers 210, 217 can utilize hardware, operating systems, middleware and software platforms known in the art to perform the specific programmed task disclosed herein. Importantly, the application server 217 is specially secured against general access because of the important information contained on the server, which needs to be secured against tampering. According to embodiments of the disclosed method, the application server 217 is configured to be accessible only to a limited number of computers at secured locations. The jump server 210 is one of the limited number of devices which the application server 217 is configured to allow access. Jump server 210 acts thereby as an intermediary for other entities to communicate with the application server 217. The jump server 210 is configured to log and audit any activity for which it acts as an intermediary, thereby providing a record of all registration processes.

The registration process steps are as follows. In a first step 225, the user device receives the application, which is pushed to authorized user devices by the backend server 215 which also stores copies of various applications used by the personnel of the organization. At this point in the process, although the application has been downloaded to the user device 205, the user device cannot activate (execute) the application without completing the remaining steps of the secure registration process. At a following step 228, the application server 217 generates an activation or verification code which the user ultimately receives at the end of the process, and which allows the user to activate the downloaded application in the user device 205. The application server 217, at step 230, generates an activation code where it can be stored along with other, similar activation codes for the registration of other applications on other user devices 205. The codes can be stored as records that include the codes in association with identification information of the users seeking to register their newly downloaded applications.

Upon request, or on a periodic basis (e.g., x number of times per day), the administrator logs into the jump server 210 from the administrator device 220 to access the activate codes stored on the application server 217. At step 235, the administrator 220 logs into the jump server 210 by a two-factor authentication process. The 2-factor authentication can be performed using any of a variety of modes including, but not limited to, providing two or more of: i) a knowledge factor such as a password or PIN; ii) a possession factor such as device ID or security token generated by software of which the administrator is the custodian; and iii) a biometric factor specific to the administrator that can be transmitted securely via the user device such as a speech pattern that identifies the administrator. At step 240, the jump server 210 establishes a secure communication session, such as via a virtual private network (VPN) or secure socket shell (SSH) with the application server 217. Once the jump server establishes communication with the application server, the application server can present a login interface which prompts for credentials for access to operating system of the application server. When the administrator provides credentials that are recognized by the application server, such as a user name and password, the administrator is provided with access to the application server and can access files and execute commands on the application server. At step 250, the administrator executes a command (script) on the application server 217 which causes the application server to output the activation codes (e.g., on screen, in a printout, or electronic file). In some implementations, the activation codes output are the codes that have been stored since the last previous access by the administrator.

Upon obtaining the activation codes, at step 255, the administrator communicates the received the activation codes without involving the application server (the communication is neither initiated at nor passes through the application server). In some implementations, the administrator manually composes and sends an email or SMS communication with the activation code in a link or alphanumeric text to the user device. In other implementations, the administrator manually provides the activation code to the user who has requested access once he has ensured that the requested access is by an approved user. In all implementations, the activation code is communicated through a channel which requires the administrator device 220 to initiate that data transfer. In other words, this step 255 is not performed automatically and requires the administrator to manually finalize the process. At step 260, the user can use the activation code (as a link or as an alphanumeric code) to register and activate the application residing on the user device.

The disclosed method enables members of a company or organization to ensure that downloaded applications are received from a secure source and that the users of the applications have been authorized to do so. Specifically, the applications downloaded can be communications/media applications that allow users to communicate using voice, video, instant messaging and other media/communication applications to users without risk of data leakage, cyber-attacks and interceptions.

It is to be understood that any structural and functional details disclosed herein are not to be interpreted as limiting the systems and methods, but rather are provided as a representative embodiment and/or arrangement for teaching one skilled in the art one or more ways to implement the methods.

It is to be further understood that like numerals in the drawings represent like elements through the several figures, and that not all components or steps described and illustrated with reference to the figures are required for all embodiments or arrangements.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and "comprising", when used in this specification, specify the presence of stated features, integers, steps, operations, elements, or components, but do not preclude the presence or addition of one or more other features, integers, steps, operations, elements, components, or groups thereof.

Terms of orientation are used herein merely for purposes of convention and referencing, and are not to be construed as limiting. However, it is recognized these terms could be used with reference to a viewer. Accordingly, no limitations are implied or to be inferred.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for securely registering and activating an application downloaded to a user device of a user, the application being provided from an application store maintained by an application server of an enterprise, wherein a number is associated with the user device, comprising:
   generating an activation code suitable for activating downloaded applications which are pending activation,
   storing the generated activation code on the application server, the application server not being accessible to the user and only being accessible to a jump server;
   enabling an administrator to access the jump server using two-factor authentication;
   accessing the application sever via the jump server;
   responding to a command by the administrator, provided through a remote connection between the jump server and the application server, by electronically communicating to the administrator any activation codes associated with applications pending activation; and
   completing registration and activation of the application downloaded by the user by the user providing a manually transferred code into the user device;
   wherein the activation code associated with the application downloaded by the user is manually transferred from the administrator to the user.

2. The method of claim 1, wherein the transfer from the administrator to the user is by way of an electronic communication not involving the application server.

3. The method of claim 1, wherein the application is downloaded to the user via a backend server different from the application server.

4. The method of claim 1, wherein the two-factor authentication is based on at least two of i) a knowledge factor, ii) a possession and iii) a biometric factor.

5. The method of claim 4, wherein the knowledge factor is one of a password and personal identification number (PIN).

6. The method of claim 4, wherein the possession factor is an identifier of a device.

7. The method of claim 1, wherein the number associated with the user device is a phone number.

8. The method of claim 1, further comprising logging the administrator activities on or through the jump server.

9. A method of securely registering and activating an application at a user device in an organization having an administrator comprising:
   generating an activation code for activating the application on the user device;
   storing the generated activation code on an application server, the application server not being accessible to the user and only being accessible to a jump server;

enabling access to the application sever via the jump server; and responding to a command by the administrator, provided through a remote connection established from a jump server accessible to the administrator after a 2-factor authentication process, by electronically communicating to the administrator the activation code associated with the application at the user device;

wherein upon receiving the output activation code, the administrator delivers the activation code to the user device for registering and activating the application.

10. The method of claim 9, further comprising storing the activation code in association with an identifier of the user device having the application to be registered and activated.

11. The method of claim 9, wherein the user device is identified by a phone number or an IP address.

12. The method of claim 9, wherein the administrator communicates the activation code to the user device via link in a text message or an email.

* * * * *